(12) United States Patent
Müller et al.

(10) Patent No.: US 12,422,593 B2
(45) Date of Patent: Sep. 23, 2025

(54) HEAT TREATABLE COATED ARTICLE HAVING ANTIREFLECTIVE COATING(S) ON SUBSTRATE

(71) Applicants: Guardian Glass, LLC, Auburn Hills, MI (US); GUARDIAN EUROPE S.A.R.L., Bertrange (LU)

(72) Inventors: Jens-Peter Müller, Bertrange (LU); Richard Vernhes, Differdange (LU); Istvan Szirbik, Bertrange (LU); Nikolett Hegedus, Bertrange (LU); Allen Chu, Auburn Hills, MI (US); Jochen Butz, Bertrange (LU)

(73) Assignees: Guardian Glass, LLC; GUARDIAN EUROPE S.A.R.L., Bertrange (LU)

( * ) Notice: Subject to any disclaimer, the term of this patent is extended or adjusted under 35 U.S.C. 154(b) by 0 days.

(21) Appl. No.: 17/674,082

(22) Filed: Feb. 17, 2022

(65) Prior Publication Data

US 2023/0258844 A1 Aug. 17, 2023

(51) Int. Cl.
*C03C 17/23* (2006.01)
*C03C 17/34* (2006.01)
*G02B 1/115* (2015.01)

(52) U.S. Cl.
CPC .............. *G02B 1/115* (2013.01); *C03C 17/23* (2013.01); *C03C 17/3417* (2013.01);
(Continued)

(58) Field of Classification Search
CPC ..... G02B 1/115; C03C 17/23; C03C 17/3417; C03C 2217/212; C03C 2217/213;
(Continued)

(56) References Cited

U.S. PATENT DOCUMENTS 6,689,475 B1 2/2004 Lin
6,782,718 B2 8/2004 Lingle et al.
(Continued)

FOREIGN PATENT DOCUMENTS

EP 3047314 A1 7/2016
WO 2023202163 A1 10/2023
(Continued)

OTHER PUBLICATIONS

International Search Report and Written Opinion received for PCT Application No. PCT/IB2023/051396, mailed on May 10, 2023, 9 pages.

*Primary Examiner* — Lauren R Colgan

(57) ABSTRACT

A coated article including a first antireflective (AR) coating supported by a glass substrate, wherein the first coating may include, moving away from the glass substrate: a dielectric first high index layer; a dielectric first low index layer; a dielectric second high index layer; a dielectric second low index layer comprising an oxide of silicon; a dielectric third high index layer comprising an oxide of niobium; a dielectric first medium index layer, wherein the third high index layer comprising the oxide of niobium is located between and directly contacting the second low index layer comprising the oxide of silicon and the first medium index layer; a dielectric third low index layer; and an overcoat layer; wherein the first coating contains no IR reflecting layer based on silver and/or gold; wherein, from the perspective of a viewer of the coated article, the first coating may be configured so that the coated article has a film side reflective ΔE* value of no greater than 3.0 upon heat treatment of at least about 580 degrees C. The ΔE* value(s) may be measured either with a substantially symmetrical/similar AR coating on the other side of the same glass substrate, or
(Continued)

absent any AR coating on the other side of the glass substrate.

30 Claims, 1 Drawing Sheet

(52) U.S. Cl.
CPC .. *C03C 2217/212* (2013.01); *C03C 2217/213* (2013.01); *C03C 2217/218* (2013.01); *C03C 2217/228* (2013.01); *C03C 2217/73* (2013.01); *C03C 2218/154* (2013.01)

(58) Field of Classification Search
CPC ........ C03C 2217/218; C03C 2217/228; C03C 2217/83; C03C 2218/154
See application file for complete search history.

(56) References Cited

U.S. PATENT DOCUMENTS

| | | |
|---|---|---|
| 9,079,802 B2 | 7/2015 | Bellman et al. |
| 9,163,150 B2 | 10/2015 | Broadway et al. |
| 9,187,366 B2 | 11/2015 | Dusoulier et al. |
| 9,908,306 B2 | 3/2018 | Hara et al. |
| 9,950,951 B2 | 4/2018 | Sternchuss et al. |
| 10,882,997 B2 | 1/2021 | Disteldorf et al. |
| 11,092,726 B1 | 8/2021 | Wuillaume et al. |
| 11,112,538 B2 | 9/2021 | Weng et al. |
| 11,168,023 B2 | 11/2021 | Ding et al. |
| 11,236,014 B2 | 2/2022 | Veerasamy et al. |
| 11,827,558 B2 | 11/2023 | Keech et al. |
| 2011/0157703 A1 | 6/2011 | Broadway et al. |
| 2017/0090071 A1 | 3/2017 | Fukaya et al. |
| 2017/0090078 A1 | 3/2017 | Decoux |
| 2018/0011225 A1* | 1/2018 | Bellman ............... C23C 14/081 |
| 2018/0217296 A1* | 8/2018 | Weng .................... C03B 27/012 |
| 2018/0321425 A1 | 11/2018 | Hart et al. |
| 2019/0248701 A1* | 8/2019 | Ganjoo ................. C23C 28/345 |
| 2020/0341170 A1 | 10/2020 | Akiba et al. |
| 2023/0292576 A1 | 9/2023 | Cho |
| 2024/0182356 A1 | 6/2024 | Egboiyi et al. |
| 2024/0253330 A1 | 8/2024 | Mahieu |
| 2025/0026681 A1 | 1/2025 | Luais et al. |

FOREIGN PATENT DOCUMENTS

| | | |
|---|---|---|
| WO | 2023230664 A1 | 12/2023 |
| WO | 2025008290 A1 | 1/2025 |

* cited by examiner

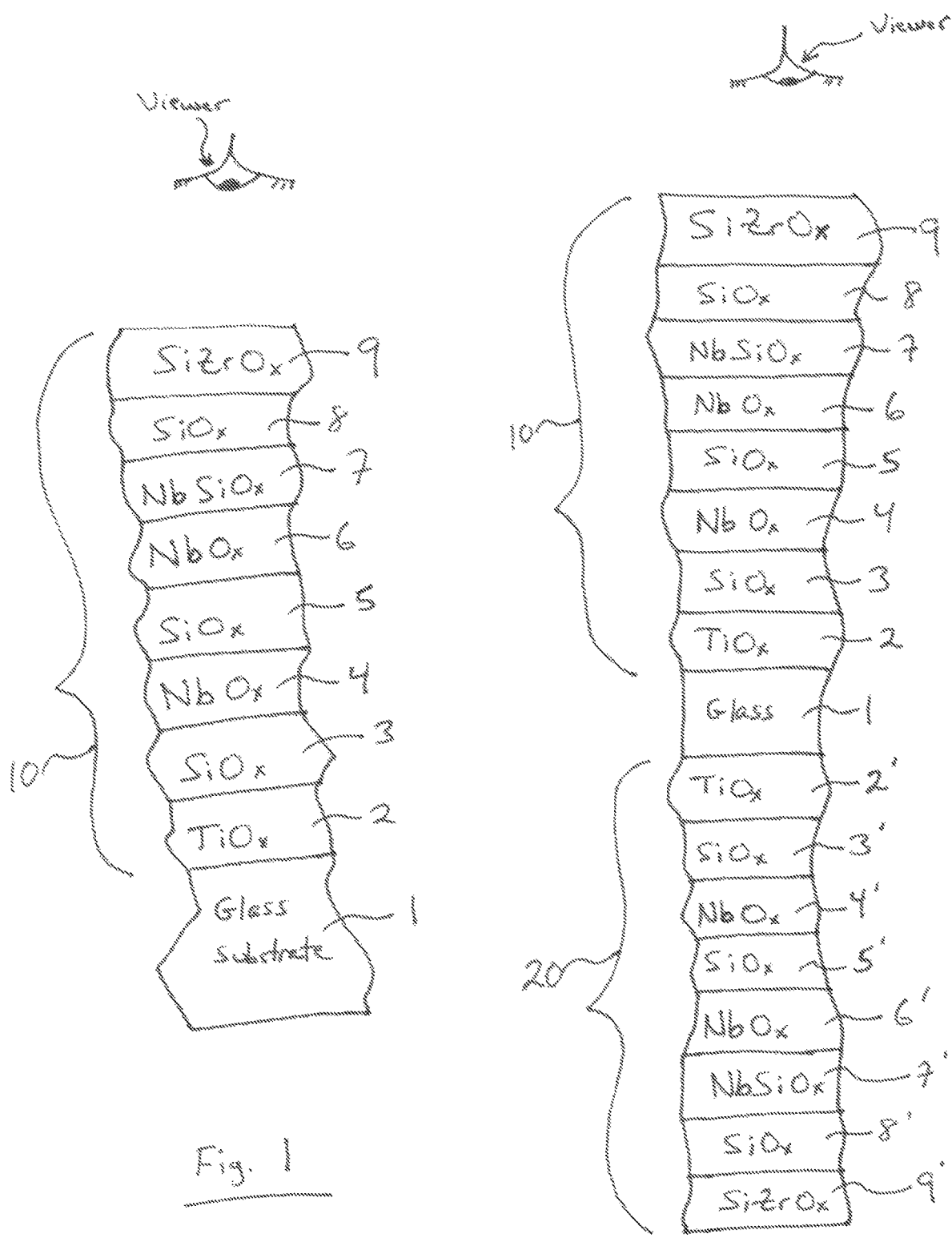

HEAT TREATABLE COATED ARTICLE HAVING ANTIREFLECTIVE COATING(S) ON SUBSTRATE

This invention relates to a coated article including an antireflective (AR) coating(s) on a substrate (e.g., glass substrate). The coating may be designed to reduce color change of the overall coated article, from the perspective of a viewer, upon heat treatment (e.g., thermal tempering), and/or to improve other optical characteristic(s) such as one or more of: providing substantially neutral coloration, reducing color variability and/or thermal stability, reducing haze, providing lower visible reflection, and/or reducing effects of aging (e.g., reflectance more stable over time, as coated (AC) and/or as heat treated (HT)). One or more such coating(s) may be provided on a given substrate, such as a single such AR coating on a single side of a glass substrate, or a pair of such AR coatings on opposite sides of a glass substrate. Such coated articles may be used in the context of monolithic windows, storefront windows, museum glass showcases, picture frame glass, retail display case windows, table tops, insulating glass (IG) window units, laminated windows, and/or other suitable applications.

BACKGROUND AND SUMMARY OF THE INVENTION

Coated articles having AR coatings are known in the art. Such coated articles are often subjected to heat treatment such as thermal tempering. Unfortunately, such coated articles have substantially different appearances with respect to color before and after heat treatment, respectively (high reflective $\Delta E^*$ values). In other words, the heat treatment causes significant change in reflective coloration of the coated article. This is undesirable because non-heat-treated and heat-treated coated articles will have significantly different appearances from the perspective of a viewer.

It has been found to be particularly difficult to design a given AR coating to have a low reflective $\Delta E^*$ value. In other words, it has been found that it is difficult to design AR coatings to have low reflective color shift upon heat treatment such as thermal tempering.

U.S. Pat. No. 11,112,538 (incorporated herein by reference in its entirety) discloses an antireflective (AR) coating on a glass substrate, where the coating may include the following layers moving from the glass substrate outwardly:

| Layer Glass | Example Range (Å) | Preferred (Å) | Most Preferred (Å) |
|---|---|---|---|
| titanium oxide: | 40-200 Å | 60-120 Å | 80-105 Å |
| silicon oxide: | 100-800 Å | 200-600 Å | 340-420 Å |
| niobium oxide: | 200-2000 Å | 700-1400 Å | 900-1200 Å |
| niobium silicon oxide: | 50-900 Å | 100-800 Å | 200-300 Å |
| silicon oxide: | 200-1000 Å | 560-700 Å | 590-650 Å |
| Zirconium silicon oxide: | 30-400 Å | 40-200 Å | 50-150 Å |

Unfortunately, it has been found that the above AR coating from Table 11 of U.S. Pat. No. 11,112,538 may be disadvantageous at least with respect to realizing one or more of: (i) undesirably large haze values upon heat treatment, (ii) substantially different appearances with respect to color before and after heat treatment, respectively (high reflective $\Delta E^*$ values), if an AR coating is provided on only one side of the glass substrate, (iii) needing asymmetrical/different AR coatings on opposite sides of the same glass substrate to achieve desirable $\Delta E^*$ value(s), since the color shift generated by the coating on the front side for example is needed to compensate for the color shift of the coating on the back side (i.e., low color shift is not possible for situations where an AR coating is provided on only one side of the glass substrate), and/or (iii) undesirably large reflectance changes upon aging.

Thus, it would be desirable to provide a coated article which improves upon one or more of the above characteristics (i), (ii), and/or (iii).

In certain example embodiments of this invention, there is provided a coated article including an antireflective (AR) coating(s) on a substrate (e.g., glass substrate). The coating may be designed to reduce color change of the overall coated article upon heat treatment (HT), from the perspective of a viewer at least at a normal viewing angle, so as to realize low reflective $\Delta E^*$ value(s) upon HT (e.g., thermal tempering). The coating may be configured so that the coated article can realize one or more of: improved thermal stability so as to realize low reflective $\Delta E^*$ value(s) of no greater than 3.0 (more preferably no greater than 2.5, even more preferably no greater than 2.0, and most preferably no greater than about 1.5) upon HT, reduced haze values upon HT, substantially neutral coloration to a viewer, reduced color variability, low visible reflection, and/or reduced effects of aging (e.g., low reflectance changes upon aging, and/or visible reflectance more stable over time as coated (AC) and/or as heat treated (HT)). One or more such coating(s) may be provided on a given substrate, such as a single such AR coating on a single side of a glass substrate, or a pair of such AR coatings on opposite sides of a glass substrate. Such coated articles may be used in the context of monolithic windows, storefront windows, museum glass showcases, picture frame glass, retail display case windows, table tops, insulating glass (IG) window units, laminated windows, and/or other suitable applications.

In certain example embodiments, it has surprisingly and unexpectedly been found that modifying the above-identified coating from U.S. Pat. No. 11,112,538, by adding a low index layer (e.g., silicon oxide based, such as $SiO_2$ based) and an adjacent high index layer (e.g., niobium oxide based, such as $NbO_x$ based), to the middle of the layer stack, results in one or more of: improved haze values, improved thermal stability upon heat treatment (HT) (i.e., lower reflective $\Delta E^*$ value(s)), substantially neutral coloration to a viewer, reduced color variability, low visible reflection, and/or reduced effects of aging (e.g., low reflectance changes upon aging, and/or visible reflectance more stable over time as coated (AC) and/or as heat treated (HT)). The coating(s) may be provided directly, or indirectly, on the glass substrate. The coating(s) may be antireflective (AR) coatings in certain example embodiments.

In an example embodiment of this invention, there is provided a coated article including a first antireflective (AR) coating supported by a glass substrate, wherein the first coating comprises, moving away from the glass substrate: a dielectric first high index layer; a dielectric first low index layer; a dielectric second high index layer; a dielectric second low index layer comprising an oxide of silicon; a dielectric third high index layer comprising an oxide of niobium; a dielectric first medium index layer, wherein the third high index layer comprising the oxide of niobium is located between and directly contacting the second low index layer comprising the oxide of silicon and the first medium index layer; a dielectric third low index layer; and an overcoat layer; wherein the first coating contains no IR reflecting layer based on silver and/or gold; wherein, from the perspective of a viewer of the coated article, the first coating is configured so that the coated article has a film side reflective $\Delta E^*$ value of no greater than 3.0 upon heat treatment of at least about 580 degrees C.

IN THE DRAWINGS

FIG. 1 is a cross sectional view of a monolithic coated article (heat treated or not heat treated) according to an example embodiment of this invention.

FIG. 2 is a cross sectional view of a monolithic coated article (heat treated or not heat treated) according to another example embodiment of this invention.

DETAILED DESCRIPTION OF CERTAIN EXAMPLE EMBODIMENTS OF THE INVENTION

Referring now more particularly to the accompanying drawings in which like reference numerals indicate like parts/elements throughout the several views.

Example embodiments of this invention relate to a coated article including a glass substrate 1, where a coating 10 is provided on the glass substrate 1. One antireflective (AR) coating 10, or a pair of AR coatings 10, 20, may be provided on the glass substrate 1. Other coatings may also be provided, such as low-E coating(s). In certain example embodiments, the coating 10 (and/or 20) may be designed to reduce color change of the overall coated article upon heat treatment (HT), from the perspective of a viewer at least at a normal viewing angle, so as to realize low reflective $\Delta E^*$ value(s) upon HT (e.g., thermal tempering). The coating 10 (and/or 20) may be configured so that the coated article realizes one or more of: improved thermal stability so as to realize low reflective $\Delta E^*$ value(s) of no greater than 3.0 (more preferably no greater than 2.5, even more preferably no greater than 2.0, and most preferably no greater than about 1.5) upon HT, reduced haze values upon HT, substantially neutral coloration to a viewer, reduced color variability, low visible reflection, and/or reduced effects of aging (e.g., low reflectance changes upon aging, and/or visible reflectance more stable over time as coated (AC) and/or as heat treated (HT)). One or more such coating(s) may be provided on a given substrate, such as a single such AR coating 10 on a single side of a glass substrate 1 as shown in FIG. 1, or a pair of such AR coatings 10, 20 on opposite sides of a glass substrate 1 as shown in FIG. 2. Such coated articles (e.g., see FIGS. 1 and 2) may be used in the context of monolithic windows, storefront windows, museum glass showcases, picture frame glass, retail display case windows, table tops, insulating glass (IG) window units, laminated windows, and/or other suitable applications. The coating(s) may be provided directly, or indirectly, on the glass substrate. The coating(s) may be antireflective (AR) coatings in certain example embodiments. From the perspective of the viewer, visible color change due to HT (e.g., thermal tempering) can be reduced or minimized, so that non-heat-treated versions and heat treated versions of the coated article appear similar to the viewer.

In certain example embodiments, it has surprisingly and unexpectedly been found that modifying the above-identified coating from Table 11 of U.S. Pat. No. 11,112,538, by adding a low index layer (e.g., silicon oxide based, such as $SiO_2$ based) 5 and an adjacent high index layer (e.g., niobium oxide based, such as $NbO_x$ based) 6, to the middle of the layer stack of, results in one or more of: improved haze values, improved thermal stability upon heat treatment (HT) (i.e., lower reflective $\Delta E^*$ value(s)), substantially neutral coloration to a viewer, reduced color variability, low visible reflection, and/or reduced effects of aging (e.g., low reflectance changes upon aging, and/or visible reflectance more stable over time as coated (AC) and/or as heat treated (HT)). The same applies to corresponding layers 5' and 6' of coating 20. In certain example embodiments, the layer stack of the coating (10 and/or 20) may include two co-sputtered layers 7, 7', 9, 9' for improved durability. The center low index layer (e.g, $SiO_x$) 5, 5' has been found with $NbO_x$ 6, 6' to reduce haze, and to reduce color shift upon HT so as to provide improved thermal stability and thus lower reflective $\Delta E^*$ value(s). The $TiO_x$ undercoat 2, 2' may be provided for added thermal stability. $SiO_x$ 3, 5, 8 provides for a dense microstructure, leading to lower aging effects.

The coatings 10 and 20 may be provided directly, or indirectly, on the glass substrate 1. The coatings 10 and 20 are designed to reduce color change of the overall coated article, from the perspective of a viewer, upon heat treatment (e.g., thermal tempering). The coatings 10 and 20 may be antireflective (AR) coatings in certain example embodiments. Contrary to U.S. Pat. No. 11,112,538 where two different coatings need to be applied on both/opposite sides of the glass substrate, certain example embodiments of this case provide for a coated article that can achieve desirably low $\Delta E^*$ value(s) either by (a) using an AR coating (e.g., 10) on only one side of the glass substrate 1 as shown in FIG. 1, and/or (b) using essentially the same layer stack design for both sides of the glass as shown in FIG. 2 to achieve low color shift due to HT (e.g., thermal tempering). From the perspective of the viewer, visible color change due to HT can be reduced or minimized, so that non-heat-treated versions and heat treated versions of the coated article appear similar to the viewer. In certain example embodiments, the first and/or second coatings 10 and 20 are designed so that the coated article realizes substantially neutral color, from the perspective of a viewer, both before and after HT. The first and second coatings 10 and 20 may have the same, or different, layer stacks in different embodiments of this invention.

Typical AR coatings themselves mostly have non-neutral reflective coloration such as blue, purple or pink coloration, and thus cannot themselves achieve reflective neutral coloration. Moreover, the non-neutral coloration of typical AR coatings becomes worse after HT such as thermal tempering. Thus, example embodiments of this invention relate to an anti-reflective coating article which can achieve reflective neutral visible coloration, both before and after heat treatment such as thermal tempering, which is advantageous for the reasons discussed herein.

Coated articles may optionally be "heat treated" (HT) in certain example embodiments of this invention, and are preferably designed to be heat treatable. The terms "heat treatment", "heat treated" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

The value $\Delta E^*$ is known in the art, and is important in determining whether or not upon heat treatment (HT) there is matchability, or substantial matchability, in the context of this invention. Color herein is described by reference to the a*, b* values. For purposes of example, the term Δa* is simply indicative of how much color value a* changes due to heat treatment. The term ΔE* is well understood in the art and is reported, along with various techniques for determining it, in ASTM 2244-93 as well as being reported in Hunter et. al., *The Measurement of Appearance*, $2^{nd}$ Ed. Cptr. 9, page 162 et seq. [John Wiley & Sons, 1987]. As used in the art, ΔE* (and ΔE) is a way of adequately expressing the change (or lack thereof) in reflectance and/or transmittance (and thus color appearance, as well) in an article after or due to HT. ΔE may be calculated by the "ab" technique, or by the Hunter technique (designated by employing a subscript "H"). ΔE* corresponds to the CIE LAB Scale L*, a*, b*. For example, as reported in Hunter et. al. referenced above, the rectangular coordinate/scale technique (CIE LAB 1976) known as the L*, a*, b* scale may be used, wherein:

L* is (CIE 1976) lightness units
a* is (CIE 1976) red-green units
b* is (CIE 1976) yellow-blue units
and the distance ΔE* between $L^*_o\ a^*_o\ b^*_o$ and $L^*_1\ a^*_1\ b^*_1$ is:

$$\Delta E^* = [(\Delta L^*)^2 + (\Delta a^*)^2 + (\Delta b^*)^2]^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values $a_h$, $b_h$, $L_h$.

FIG. 1 is a cross sectional view of a coated article according to an example embodiment of this invention. Glass substrate 1 (e.g., clear, green, bronze, grey, blue, or blue-green glass for instance) may be from about 1.0 to 12.0 mm thick, more preferably from about 4-8 mm thick, with an example glass substrate thickness being about 6 mm thick. All layers shown in FIG. 1 (and FIG. 2) are transparent dielectric layers, and all may be deposited via sputter-deposition or any other suitable technique. Multi-layer AR coatings offer broad antireflection regions in the spectrum, and may for example be based on AR principles of quarter-half-quarter, where moving outwardly from the glass the coatings may each include a quarter wave medium index layer, a half wave high index layer, a quarter wave low index layer, and then air. Moreover, a thin hydrophobic layer may be provided over the AR coating(s) in certain example instances, and/or one could add a thin layer between high and low index layers to improve interfacial adhesion in certain example embodiments. A single AR coating 10 is provided in the FIG. 1 embodiment. In the FIG. 1 embodiment, a low-E coating (not shown) may be provided on the side of the glass substrate 1 opposite coating 10, and such a coated article may be used in monolithic or IG window unit applications for example. Example low-E coatings are described, for purposes of example, in U.S. Pat. Nos. 11,236,014, 11,168,023, and 10,882,997, the disclosures of which are hereby incorporated herein by reference in their entireties. Instead of a low-E coating on the side of the glass substrate 1 opposite AR coating 10, another substantially the same AR coating may be provided in a symmetrical manner as shown by AR coating 20 in FIG. 2.

In the FIG. 2 embodiment, antireflective (AR) coating 10 is provided on one side of glass substrate 1, and another AR coating 20 is provided on the other side of glass substrate 1. The coatings 10 and 20 may be the same, or similar, in certain example embodiments. In the FIG. 2 embodiment, the materials of the respective layers of coatings 10 and 20 may be of the same materials, but layer thicknesses between the two coatings may vary. In certain example embodiments, coatings 10 and 20 do not contain any infrared (IR) reflecting layer based on silver or gold. AR coating 10 includes sputter-deposited layers 2, 3, 4, 5, 6, 7, 8, and 9 whereas AR coating 20 includes corresponding sputter-deposited layers 2', 3', 4', 5', 6', 7', 8', and 9'. Corresponding layers in coatings 10/20 may be of like material and/or like thickness.

Referring to FIGS. 1-2, layers 2, 2', 4, 4', 6 and 6' are high index layers having a refractive index (n) of at least about 2.15, more preferably of at least about 2.20, and most preferably of at least about 2.25. High index layers 2, 2', 4, 4', 6 and 6' may each be of or including high index transparent dielectric material such as titanium oxide (e.g., $TiO_x$, where x is from 1.5 to 2.0, more preferably from 1.8 to 2.0, with an example being $TiO_2$) or niobium oxide (e.g., $NbO_x$ where x is from 1.4 to 2.1, more preferably from 1.5 to 2.0, with examples being $Nb_2O_5$ and $NbO_2$). Note that all refractive index (n) values discussed herein are at a wavelength of 550 nm. Layers 3, 3', 5, 5', 8, and 8' are low index layers having a refractive index (n) of less than about 1.8, more preferably less than about 1.7, and most preferably less than about 1.6. Low index layers 3, 3', 5, 5', 8, and 8' may each be of or including low index transparent dielectric material such as silicon oxide (e.g., $SiO_2$) or any other suitable low index material. The silicon oxide (e.g., $SiO_2$) of any of layers 3, 3', 5 and/or 5' may be doped with other materials such as aluminum (Al) and/or nitrogen (N) in certain example embodiments of this invention. For example and without limitation, any of layers 3, 3', 5, 5', 8, and/or 8' may be of or including silicon oxide (e.g., $SiO_2$) and may include from about 0-8% (more preferably from 1-5%) Al and/or from about 0-10% (more preferably from about 1-5%) N. Likewise, the titanium oxide and/or niobium oxide of the high index layers 2, 2', 4, 4', 6 and 6' may also be doped with other materials in certain example embodiments. It is possible for the combination of layers 2 and 3 (or 2' and 3'), for example, to be replaced with a medium index layer (e.g., $NbSiO_x$) having a refractive index (n) of from 1.70 to 2.10, more preferably from 1.75 to 2.0, and even more preferably from 1.75 to 1.95. Medium index layers 7, 7', 9, and 9' each have a refractive index (n) of from 1.70 to 2.10, more preferably from 1.75 to 2.0, and even more preferably from 1.75 to 1.95. In certain example embodiments, medium index layers 7 and 7' may be of a medium index material such as a combination of niobium oxide and silicon oxide (also known as niobium silicon oxide), or another material such as a combination of titanium oxide and silicon oxide (also known as titanium silicon oxide), or any other suitable medium index material. In certain example embodiments, medium index layers 9, and 9' may be of a medium index material such as a combination of zirconium oxide and silicon oxide (also known as zirconium silicon oxide), or any other suitable medium index material. And the zirconium in layers 9, 9' helps improve durability of the respective coatings 10 and 20. It is also noted that stack sequences from either the FIG. 1 or FIG. 2 embodiment may be repeated, so that for example another sequence of layers 2-8 could be provided on top of the layers illustrated in each coating in FIGS. 1-2. In certain example embodiments, it is possible for each of the layers to include other materials such as dopants. It will be appreciated of course that other layers may also be provided, or certain layers may be omitted, and different materials may be used, in certain alternative embodiments of this invention.

It is noted that the terms "oxide" and "nitride" as used herein include various stoichiometries. For example, the term silicon oxide includes stoichiometric $SiO_2$, as well as non-stoichiometric silicon oxide. As another example, the term titanium oxide includes stoichiometric $TiO_2$, as well as non-stoichiometric titanium oxide.

Generally, other layer(s) may also be provided in other locations of the coatings. Thus, while the coatings 10 and 20 or layers thereof is/are "on" or "supported by" substrate 1 (directly or indirectly), other layer(s) may be provided therebetween. Thus, for example, a layer or coating is considered "on" the substrate 1 even when other layer(s) may be provided therebetween (i.e., the terms "on" and "supported by" as used herein are not limited to directly contacting). However, there may be the direct contacts shown in FIGS. 1 and 2 in example embodiments.

It has surprisingly and unexpectedly been found that modifying the above-identified coating from Table 11 of U.S. Pat. No. 11,112,538, by adding a low index layer (e.g., silicon oxide based, such as $SiO_2$ based) 5 (and/or 5') and an adjacent high index layer (e.g., niobium oxide based, such as $NbO_x$ based) 6 (and/or 6'), to the middle of the layer stack of, results in one or more of: improved haze values, improved thermal stability upon heat treatment (HT) (i.e., lower reflective $\Delta E^*$ value(s)), substantially neutral coloration to a viewer, reduced color variability, low visible reflection, and/or reduced effects of aging (e.g., low reflectance changes upon aging, and/or visible reflectance more stable over time as coated (AC) and/or as heat treated (HT)). The same applies to corresponding layers 5' and 6' of coating 20. Co-sputtered layers 7, 7', 9, 9' may be provided for improved durability. The center low index layer (e.g, $SiO_x$) 5, 5' has been found with $NbO_x$ 6, 6' to reduce haze, and to reduce color shift upon HT so as to provide improved thermal stability and thus lower reflective $\Delta E^*$ value(s). The $TiO_x$ undercoat 2, 2' may be provided for added thermal stability. One or more of $SiO_x$ inclusive layers 3, 5, 8 may be provided for a dense microstructure, leading to lower aging effects.

In certain example embodiments, the first low index layer 3 may be at least twice as thick as the second low index layer 5 (more preferably at least three times as thick); and/or the third low index layer 8 may be at least twice as thick as the second low index layer 5 (more preferably at least three times as thick, or at least four times as thick). In certain example embodiments, the second and third high index layers 4 and 6 may be substantially the same thickness, namely the same thickness plus/minus about 15%.

Turning back to the FIG. 1-2 embodiments, various thicknesses may be used consistent with one or more of the needs discussed herein. According to certain example embodiments of this invention, example thicknesses (in angstroms) and materials for the respective layers 2-9 of the coating 10 on the glass substrate 1 are as follows in certain example embodiments for achieving desired visible transmission, low visible reflection, fairly neutral reflective coloration, low haze, and thermal stability upon optional HT (layers are listed in order moving away from the glass substrate 1). Table 1 below provides example materials and thicknesses for AR coating 10 and/or 20, before and/or after optional HT. Similar materials/thicknesses may of course be provide for layers 2'-9' of coating 20.

TABLE 1

(Example Coating Materials/Thicknesses)

| Layer<br>Glass Substrate 1 | Example<br>(Å) | Preferred<br>(Å) | Most<br>Preferred (Å) |
|---|---|---|---|
| titanium oxide (e.g., $TiO_2$; layer 2): | 40-200 Å | 60-120 Å | 80-105 Å |
| silicon oxide (e.g., $SiO_2$; layer 3): | 100-800 Å | 350-470 Å | 400-440 Å |
| niobium oxide (e.g., $Nb_2O_5$; layer 4): | 150-800 Å | 350-480 Å | 400-450 Å |
| silicon oxide (e.g., $SiO_2$; layer 5): | 40-400 Å | 60-160 Å | 80-120 Å |
| niobium oxide (e.g., $Nb_2O_5$; layer 6): | 150-800 Å | 340-480 Å | 380-430 Å |
| niobium silicon oxide (layer 7): | 50-900 Å | 100-500 Å | 200-300 Å |
| silicon oxide (e.g., $SiO_2$; layer 8): | 200-1000 Å | 560-700 Å | 590-650 Å |
| zirconium silicon oxide (layer 9): | 30-400 Å | 40-200 Å | 50-150 Å |

Before any optional heat treatment (HT) such as thermal tempering, heat bending, and/or heat strengthening, in certain example embodiments of this invention coated articles according to the FIG. 1 and/or FIG. 2 embodiment(s) may have color/optical characteristics as follows in Table 2 according to Illuminant C, 2 degree observer. And Table 3 provides example data after HT. It is noted that TY and $T_{vis}$ stand for visible transmission through the FIG. 1 coated article in Table 2, RY stands for visible reflectance of the coated article from the point of view of the intended viewer, and that the a* and b* values under RY stand for the respective CIE visible reflectance colorations of the overall coated article from the point of view of the intended viewer and indicate neutral reflective coloration of the overall coated article. Subscript "g" indicates from the glass side of the coated article (e.g., FIG. 1 embodiment), and subscript "f" indicates from the film/coating side of the coated article. The a*, b* values under $R_fY$ relate to "film" side reflective coloration values, and the a*, b* values under $R_gY$ relate to glass side reflective coloration values. The $\Delta E^*$ values in Table 3, indicating thermal stability, are at the normal viewing angle, or at about an 8 degree viewing angle.

TABLE 2

Optical Characteristics (FIG. 1 and/or 2 coated article; as-coated & pre-HT)

| | General | Preferred | Most Preferred |
|---|---|---|---|
| $T_{vis}$ (TY): | ≥60% | ≥70% | ≥80% |
| Ta*: | −4 to +4 | −2 to +2 | −1 to +1 |
| Tb*: | −4 to +4 | −2 to +2 | −1 to +1 |
| $R_fY$: | ≤5 or 1% | ≤0.90% | ≤0.80% |
| a*: | −5 to +4 | −4 to 0 | −3 to −1 |
| b*: | −13 to +3 | −10 to −5 | −9 to −6 |
| $R_gY$: | ≤5 or 1% | ≤0.90% | ≤0.80% |
| a*: | −5 to +4 | −4 to 0 | −3 to +1 |
| b*: | −13 to +3 | −10 to −5 | −9 to −6 |
| Haze Value: | ≤2 | ≤0.50 | ≤0.30 |

TABLE 3

Optical Characteristics (Fig. 1 and/or 2 coated article; after optional HT)

|  | General | Preferred | Most Preferred |
|---|---|---|---|
| $T_{vis}$ (TY): | ≥60% | ≥70% | ≥80% |
| Ta*: | −4 to +4 | −2 to +2 | −1 to +1 |
| Tb*: | −4 to +4 | −2 to +2 | −1 to +1 |
| $R_fY$: | ≤5 or 1% | ≤0.90% | ≤0.75% |
| a*: | −5 to +4 | −4 to 0 | −3 to +1 |
| b*: | −13 to +3 | −10 to −5 | −9 to −6 |
| $R_gY$: | ≤5 or 1% | ≤0.80% | ≤0.70% |
| a*: | −5 to +4 | −4 to 0 | −3 to +1 |
| b*: | −13 to +3 | −10 to −5 | −9 to −6 |
| Haze Value: | ≤1.0 | ≤0.50 | ≤0.45 |
| ΔE*: | ≤5.0 or 3.0 | ≤2.50 | ≤2.0 or 1.5 |

It can be seen from Table 2 (pre-HT) and Table 3 (post-HT) above that the overall coated article has high visible transmission, low visible reflectance due to the AR coating(s) 10 and/or 20, good thermal stability, low haze, and neutral appearance from the point of view of the intended viewer.

EXAMPLES

Example 1 according to an example embodiment of this invention is compared below to Comparative Example (CE) 1. Each, as shown in FIG. 2 of the instant application, has the same coating on both sides of the glass substrate 1 so as to represent symmetrical coatings. In particular, each has an AR coating, where the Example 1 coating shown below was provided in a symmetrical manner on both sides of the glass substrate 1 for Example 1 as shown in FIG. 2 of the instant application, and the coating of CE 1 on both sides of the glass substrate is based on the coating from Table 11 of U.S. Pat. No. 11,112,538.

Example 1 Coating

| Material | Thickness [nm] |
|---|---|
| AIR | |
| SiZrOx | 8.5 |
| SiOx | 62.8 |
| NbSiOx | 25 |
| NbOx | 40.4 |
| SiOx | 10 |
| NbOx | 42.6 |
| SiOx | 41.3 |
| TiOx | 9.1 |
| GLASS | total 239.6 |

Comparative Example (CE) 1 Coating

| | Thickness [nm] |
|---|---|
| Air | |
| SiZrOx | 10 |
| SiOx | 56 |
| NbSiOx | 25 |
| NbOx | 98 |
| SiOx | 37 |
| TiOx | 10 |
| Glass | total: 236 nm |

Measured monolithically, both before and after thermal tempering (HT), with a Perkin Elmer device, the coatings on the glass substrate of Example 1 and Comparative Example 1 (CE 1) had the following optical characteristics. These measurements were taken with the same coating on both sides of the glass substrate, for example as shown in FIG. 2 for Example 1. Note that all coatings had visible transmission well over 70%, before and after HT at a temperature of at least 580 degrees C. (e.g., thermal tempering, heat strengthening, and/or heat bending). The data for Example 1 is in the two right-most columns, whereas data for CE 1 is in the second and third columns from the left edge of the table. "AC" stands for as coated which is before HT such as thermal tempering, whereas "HT" stands for heat treatment/heat treated such as thermal tempering. It is noted that, for example, if coating 20 was removed from FIG. 2/Example 1, then the ΔE* values would be approximately half what they are shown below when both coatings 10 and 20 are present.

| | Comparative Example 1 (CE 1) | | Example 1 | |
|---|---|---|---|---|
| | AC | HT | AC | HT |
| TY (UC) | 98.3 | 98.4 | 97.6 | 98.2 |
| Ta* | 0.44 | 0.56 | 0.33 | 0.33 |
| Tb* | 0.63 | 0.21 | 0.81 | 0.3 |
| Rf Y | 0.8 | 0.73 | 0.77 | 0.70 |
| Rf L* | 7.37 | 6.84 | 7.0 | 6.3 |
| Rf a* | 2.98 | 0.47 | −1.9 | −0.8 |
| Rf b* | −8.92 | −2.5 | −8.0 | −8.6 |
| Rg Y | 0.81 | 0.72 | 0.79 | 0.69 |
| Rg L* | 7.46 | 6.67 | 7.14 | 6.2 |
| Rg a* | −2.77 | −0.67 | −1.99 | −0.82 |
| Rg b* | −9.05 | −2.39 | −8.51 | −8.76 |
| ΔE* (film side R) | 6.9 | | 1.5 | |
| ΔE* (glass side R) | 7.027 | | 1.5 | |
| RfY after aging | >1.0 | | <1.0 | |
| Haze | 0.20 | 0.9 | 0.2 | 0.4 |

It can be seen from the above table that Example 1, with the addition of layers 5 and 6 to the coating as shown in FIGS. 1-2, had unexpectedly and surprisingly improved values with respect to haze and thermal stability (ΔE*), compared to Comparative Example 1 (CE 1). For example, upon HT, Example 1 had a desirably low ΔE* value of 1.5, whereas Comparative Example 1 had an undesirably high ΔE* value of 6.9. This demonstrates that the addition of layers 5 and 6 to the coating surprising and unexpectedly improved thermal stability of the coated article in a significant manner. Glass side thermal stability was similarly improved. As another example, after HT, Example 1 had a desirably low haze value of 0.4, whereas Comparative Example 1 had an undesirably high haze value of 0.9. This demonstrates that the addition of layers 5 and 6 to the coating surprising and unexpectedly reduced the haze value of the coated article. It can also be seen that Example 1 had slightly better (lower) film side reflection ($R_fY$) compared to CE 1. The table above also shows that aging did not adversely affect Example 1 as much as CE 1, with respect to film side reflection ($R_fY$).

In an example embodiment of this invention, there is provided a coated article including a first antireflective (AR) coating supported by a glass substrate, wherein the first coating comprises, moving away from the glass substrate: a dielectric first high index layer; a dielectric first low index layer; a dielectric second high index layer; a dielectric second low index layer comprising an oxide of silicon; a dielectric third high index layer comprising an oxide of niobium; a dielectric first medium index layer, wherein the third high index layer comprising the oxide of niobium is located between and directly contacting the second low index layer comprising the oxide of silicon and the first medium index layer; a dielectric third low index layer; and an overcoat layer; wherein the first coating contains no IR reflecting layer based on silver and/or gold; wherein, from the perspective of a viewer of the coated article, the first coating is configured so that the coated article has a film side reflective $\Delta E^*$ value of no greater than 3.0 upon heat treatment of at least about 580 degrees C. The $\Delta E^*$ value(s) discussed herein may be measured, with a substantially symmetrical AR coating on the other side of the same glass substrate as shown in FIG. 2, or absent any AR coating on the other side of the glass substrate as shown in FIG. 1.

In the coated article of the immediately preceding paragraph, the first coating may be configured so that the coated article has a film side reflective $\Delta E^*$ value of no greater than 2.5, more preferably no greater than 2.0.

In the coated article of any of the preceding two paragraphs, the first coating may be configured so that the coated article has a glass side reflective $\Delta E^*$ value of no greater than 2.5, more preferably no greater than 2.0.

In the coated article of any of the preceding three paragraphs, the first coating on the glass substrate may have a visible reflectance of no greater than 5%, more preferably no greater than 1%.

In the coated article of any of the preceding four paragraphs, the coated article may have a visible transmission of at least 70%, more preferably at least 90%.

In the coated article of any of the preceding five paragraphs, all layers of the first coating may be transparent dielectric layers.

In the coated article of any of the preceding six paragraphs, the coated article may or may not be heat treated (e.g., thermally tempered). When HT, the coated article preferably has a haze value no greater than 0.50, more preferably no greater than 0.45.

In the coated article of any of the preceding seven paragraphs, the first coating may be configured so that the coated article has film side reflective a* value of from −4 to 0, and a film side reflective b* value of from −10 to −5; and/or may be configured so that the coated article has film side reflective a* value of from −3 to −1, and a film side reflective b* value of from −9 to −6; before and/or after any optional heat treatment.

In the coated article of any of the preceding eight paragraphs, the first, second, and third high index layers may each have a refractive index (n) of at least 2.15 (more preferably of at least 2.20), and/or the first, second, and third low index layers may each have a refractive index (n) of no greater than 1.7 (more preferably no greater than 1.6).

In the coated article of any of the preceding nine paragraphs, the first, second, and/or third low index layers may comprise an oxide of silicon (e.g., $SiO_2$ which may or may not be doped with other material such as from about 1-7% Al).

In the coated article of any of the preceding ten paragraphs, the first high index layer may be of or include an oxide of titanium.

In the coated article of any of the preceding eleven paragraphs, the second and/or third high index layers may be of or include an oxide of niobium.

In the coated article of any of the preceding twelve paragraphs, the medium index layer may be of or include an oxide of silicon and an oxide of niobium.

In the coated article of any of the preceding thirteen paragraphs, the overcoat layer may be of or include an oxide of Zr and Si.

In the coated article of any of the preceding fourteen paragraphs, the first low index layer of the first coating may be at least twice as thick as the second low index layer of the first coating; and/or the third low index layer of the first coating may be at least twice as thick as the second low index layer of the first coating.

In the coated article of any of the preceding fifteen paragraphs, the second and third high index layers may be substantially the same thickness, plus/minus 15%.

The coated article of any of the preceding sixteen paragraphs may further comprise a second coating on a side of the glass substrate opposite the first coating, wherein the second coating may comprise, moving away from the glass substrate: a dielectric first high index layer; a dielectric first low index layer; a dielectric second high index layer; a dielectric second low index layer comprising an oxide of silicon; a dielectric third high index layer comprising an oxide of niobium; a dielectric first medium index layer, wherein the third high index layer comprising the oxide of niobium is located between and directly contacting the second low index layer comprising the oxide of silicon and the first medium index layer; a dielectric third low index layer; and an overcoat layer.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a first antireflective (AR) coating supported by a glass substrate, wherein the first AR coating comprises, moving away from the glass substrate:
   a dielectric first high index layer;
   a dielectric first low index layer;
   a dielectric second high index layer;
   a dielectric second low index layer;
   a dielectric third high index layer;
   a dielectric first medium index layer, wherein the third high index layer is located between and directly contacting the second low index layer and the first medium index layer,
   wherein the dielectric first high index layer comprises a different material than that of the dielectric second high index layer, and
   wherein, from the perspective of a viewer of the coated article, the first AR coating is configured so that the coated article has a film side reflective $\Delta E^*$ value of no greater than 3.0 upon heat treatment of at least about 580 degrees C.

2. The coated article of claim 1, wherein the first AR coating is configured so that the coated article has a film side reflective $\Delta E^*$ value of no greater than 2.5.

3. The coated article of claim 1, wherein the first AR coating is configured so that the coated article has a film side reflective ΔE* value of no greater than 2.0.

4. The coated article of claim 1, wherein the first AR coating is configured so that the coated article has a glass side reflective ΔE* value of no greater than 2.5.

5. The coated article of claim 1, wherein the first AR coating is configured so that the coated article has a glass side reflective ΔE* value of no greater than 2.0.

6. The coated article of claim 1, wherein the first AR coating on the glass substrate has a visible reflectance of no greater than 5%.

7. The coated article of claim 1, wherein the first AR coating on the glass substrate has a visible reflectance of no greater than 1%.

8. The coated article of claim 1, wherein the coated article has a visible transmission of at least 70%.

9. The coated article of claim 1, wherein the first AR coating is provided on only one side of the glass substrate, so that no AR coating is provided on the side of the glass substrate opposite the first AR coating.

10. The coated article of claim 1, wherein all layers of the first AR coating are transparent dielectric layers.

11. The coated article of claim 1, wherein the coated article is heat treated, and has a haze value no greater than 0.50.

12. The coated article of claim 1, wherein the coated article is thermally tempered.

13. The coated article of claim 1, wherein the first AR coating is configured so that the coated article has film side reflective a* value of from −4 to 0, and a film side reflective b* value of from −10 to −5, before and/or after any optional heat treatment.

14. The coated article of claim 1, wherein the first AR coating is configured so that the coated article has film side reflective a* value of from −3 to −1, and a film side reflective b* value of from −9 to −6, before and/or after any optional heat treatment.

15. The coated article of claim 1, wherein the first, second, and third high index layers each have a refractive index (n) of at least 2.15, and the first, second, and third low index layers each have a refractive index (n) of no greater than 1.7.

16. The coated article of claim 1, wherein the first, second, and third low index layers each comprise an oxide of silicon.

17. The coated article of claim 1, wherein the first high index layer comprises an oxide of titanium.

18. The coated article of claim 1, wherein the second and third high index layers each comprise an oxide of niobium.

19. The coated article of claim 1, wherein the medium index layer comprises an oxide of silicon and an oxide of niobium.

20. The coated article of claim 1, wherein the overcoat layer comprises oxide of Zr and Si.

21. The coated article of claim 1, wherein the first low index layer of the first AR coating is at least twice as thick as the second low index layer of the first AR coating.

22. The coated article of claim 1, wherein the third low index layer of the first AR coating is at least twice as thick as the second low index layer of the first coating.

23. The coated article of claim 1, wherein the second and third high index layers are substantially the same thickness, plus/minus 15%.

24. The coated article of claim 1, further comprising a second AR coating on a side of the glass substrate opposite the first AR coating, wherein the second AR coating comprises, moving away from the glass substrate:
   a dielectric first high index layer;
   a dielectric first low index layer;
   a dielectric second high index layer;
   a dielectric second low index layer comprising an oxide of silicon;
   a dielectric third high index layer comprising an oxide of niobium;
   a dielectric first medium index layer, wherein the third high index layer comprising the oxide of niobium is located between and directly contacting the second low index layer comprising the oxide of silicon and the first medium index layer;
   a dielectric third low index layer; and
   an overcoat layer.

25. A coated article including first and second antireflective (AR) coatings supported by a glass substrate, wherein the first and second AR coatings are provided on opposite sides of the glass substrate and each comprise, moving away from the glass substrate:
   a dielectric first high index layer;
   a dielectric first low index layer;
   a dielectric second high index layer;
   a dielectric second low index layer comprising an oxide of silicon;
   a dielectric third high index layer comprising an oxide of niobium;
   a dielectric first medium index layer, wherein the third high index layer comprising the oxide of niobium is located between and directly contacting the second low index layer comprising the oxide of silicon and the first medium index layer;
   a dielectric third low index layer; and
   an overcoat layer;
   wherein the first AR coating contains no IR reflecting layer based on silver and/or gold;
   wherein, from the perspective of a viewer of the coated article, the first and second AR coatings are configured so that the coated article has a film side reflective ΔE* value of no greater than 3.0 upon heat treatment of at least about 580 degrees C.

26. A method of making a coated article, the method comprising:
   heat treating a coated article at a temperature of at least 580 degrees C.,
   wherein the coated article includes a first antireflective (AR) coating supported by a glass substrate, wherein the first AR coating comprises, moving away from the glass substrate:
   a dielectric first high index layer;
   a dielectric first low index layer;
   a dielectric second high index layer;
   a dielectric second low index layer;
   a dielectric third high index layer;
   a dielectric first medium index layer, wherein the third high index layer is located between and directly contacting the second low index layer and the first medium index layer,
   wherein the dielectric first high index layer comprises a different material than that of the dielectric second high index layer, and
   wherein, from the perspective of a viewer of the coated article, the first AR coating is configured so that the coated article has a film side reflective ΔE* value of no greater than 3.0 upon the heat treating.

27. The coated article of claim 1, wherein the first AR coating further comprises, moving away from the glass substrate, a dielectric third low index layer and an overcoat layer.

28. The coated article of claim 1, wherein the dielectric second low index layer comprises an oxide of silicon.

29. The coated article of claim 1, wherein the dielectric third high index layer comprises an oxide of niobium.

30. The coated article of claim 1, wherein the first AR coating contains no IR reflecting layer based on silver and/or gold.

* * * * *